(12) United States Patent
Toda

(10) Patent No.: US 7,094,083 B2
(45) Date of Patent: Aug. 22, 2006

(54) CARD CONNECTOR ASSEMBLY

(75) Inventor: Shinsaku Toda, Kanagawa (JP)

(73) Assignee: Tyco Electronics AMP K.K, Kanagawa-Ken (JP)

( * ) Notice: Subject to any disclaimer, the term of this patent is extended or adjusted under 35 U.S.C. 154(b) by 0 days.

(21) Appl. No.: 10/881,633

(22) Filed: Jun. 30, 2004

(65) Prior Publication Data

US 2005/0003691 A1 Jan. 6, 2005

(30) Foreign Application Priority Data

Jul. 4, 2003 (JP) .............................. 2003-270974

(51) Int. Cl.
H01R 13/62 (2006.01)

(52) U.S. Cl. .................................... 439/159

(58) Field of Classification Search ................ 439/159, 439/160, 155, 157, 152, 153, 374, 377
See application file for complete search history.

(56) References Cited

U.S. PATENT DOCUMENTS 5,683,258 A * 11/1997 Takano et al. .............. 439/159
5,707,245 A * 1/1998 Yamamoto et al. ......... 439/160
5,921,792 A * 7/1999 Chen .......................... 439/160
6,095,835 A * 8/2000 Oguchi ....................... 439/159
6,120,309 A * 9/2000 Hara .......................... 439/159
6,176,714 B1 * 1/2001 Ishida et al. ................ 439/159
6,227,879 B1 * 5/2001 Dong ......................... 439/159
6,609,918 B1 * 8/2003 Uchikawa ................... 439/160

FOREIGN PATENT DOCUMENTS

JP          2002-110286      4/2002

* cited by examiner

Primary Examiner—Tho D. Ta
Assistant Examiner—Felix O. Figueroa
(74) Attorney, Agent, or Firm—Barley Snyder LLC

(57) ABSTRACT

A card connector assembly that enables smooth insertion of a card into a card receiving opening, by preventing the front end of the card from striking the card receiving opening during insertion. The card connector assembly includes a frame, and an ejecting mechanism. The frame has a card receiving opening at a first end, and a connector at a second end. The connector electrically connects with a card, which is inserted into the frame. The ejecting mechanism includes a push rod, which is slidable in the insertion/ejection direction of the card. An eject button is provided at the end of the push rod on the side of the card receiving opening. A guide, for guiding the card to be inserted into the card receiving opening, is formed on the eject button.

7 Claims, 6 Drawing Sheets

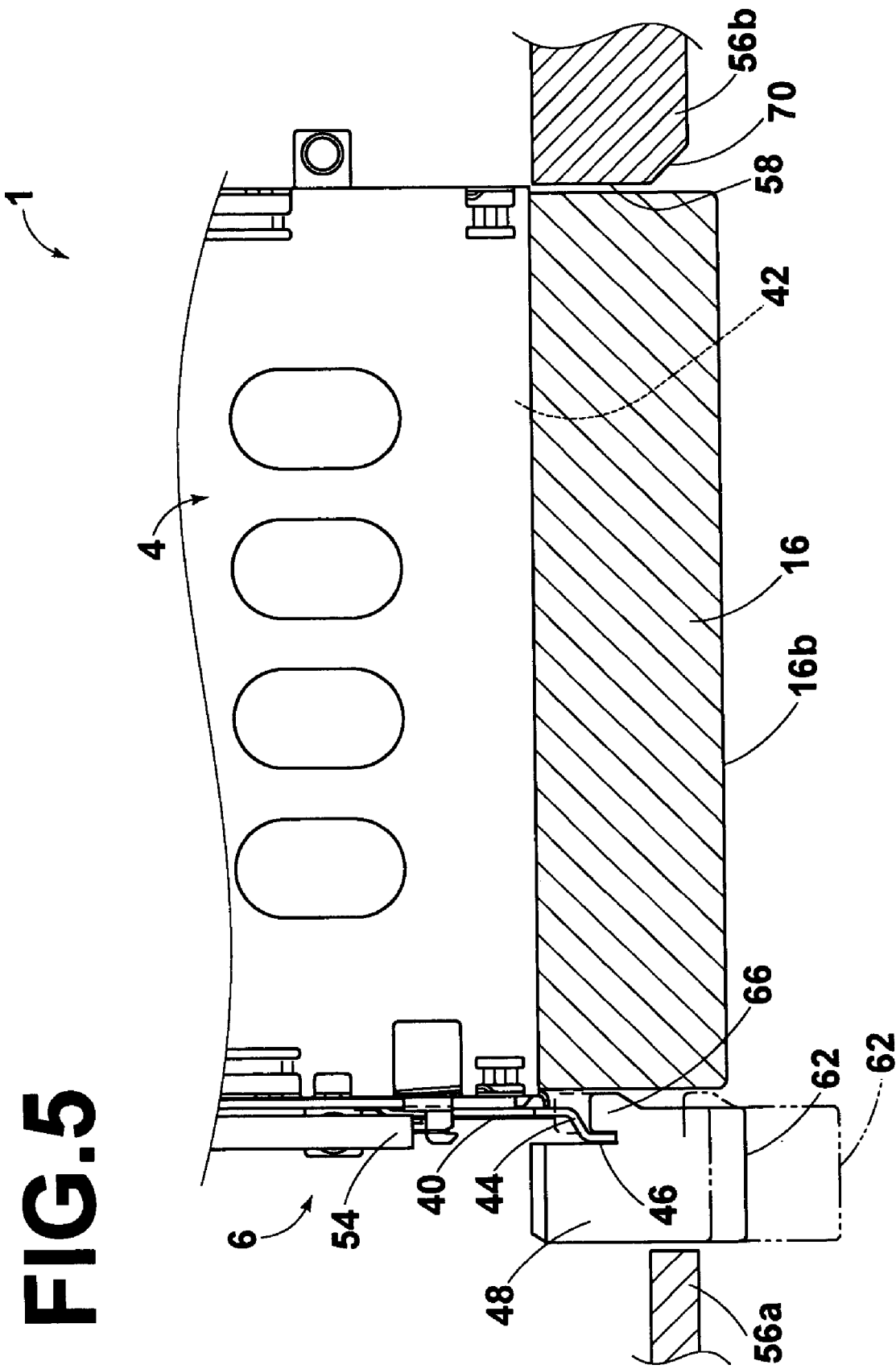

US 7,094,083 B2

CARD CONNECTOR ASSEMBLY

FIELD OF THE INVENTION

The present invention relates to a card connector assembly, for use in personal computers and the like. Particularly, the present invention relates to a card connector assembly, which is useful in smaller computers, such as lap top personal computers.

BACKGROUND

An ejecting mechanism is generally provided in a card connector assembly that receives PC (Personal Computer) cards according to the PCMCIA (Personal Computer Memory Card International Association) standard. The ejecting mechanism ejects cards, which are inserted into the card connector assembly. Normally, the ejecting mechanism is attached to a lateral side portion of a frame that receives the card. The card, which is inserted in the frame, is generally ejected by pressing an eject button of the ejecting mechanism.

A conventional connector ejecting mechanism, is disclosed in Japanese Unexamined Patent Publication No. 2002-110286. That publication (FIG. 2) show an eject button of the ejecting mechanism is provided on a lateral side of the frame, in the vicinity of a card receiving opening. A gap, is located between the eject button and the card receiving opening.

In the above known connector, the gap, is at least equivalent to the plate thickness of the frame. Therefore, during insertion of the card, the front end of the card sometimes undesirably strikes the front end of the frame, preventing smooth insertion of the card. Where the ejecting mechanism and the card receiving opening are separated, a guide, for guiding the card to be inserted, may be provided on a case that houses the card connector assembly. However, along with the miniaturization of the computer these card connector assemblies are also being miniaturized. Therefore, design constraints have led to a tendency for ejecting mechanisms and card receiving openings to be in close proximity to each other, leaving little or no space for providing guides on the cases.

SUMMARY

The present invention has been developed in view of the above circumstances. It is an object of the present invention to provide a relatively smaller card connector assembly that enables smooth insertion of a card into a card receiving opening by preventing the front end of the card from striking the card receiving opening during insertion.

The card connector assembly of the present invention features a frame having a card receiving opening . A connector, is attached to the frame at the end thereof opposite that of the card receiving opening, for electrically connecting with a card, which is inserted into the frame. An ejecting mechanism, is attached to a lateral side of the frame, for ejecting the card. A push rod, which is a part of the ejecting mechanism, that slides along the insertion/ejection direction of the card. An eject button is provided on the push rod at the end thereof on the side of the card receiving opening and a guide portion formed on the eject button guides the card, toward the card receiving opening.

BRIEF DESCRIPTION OF THE DRAWINGS

FIG. 2 shows the card connector of FIG. 1, wherein

FIG. 3 shows a frame assembly, which is utilized in the card connector assembly of FIG. 1, wherein

FIG. 4 shows the frame assembly of FIG. 3, wherein

FIG. 5 is a partial exploded view of the vicinity of a card receiving opening of the card connector assembly.

DETAILED DESCRIPTION OF THE INVENTION

Figure 1:
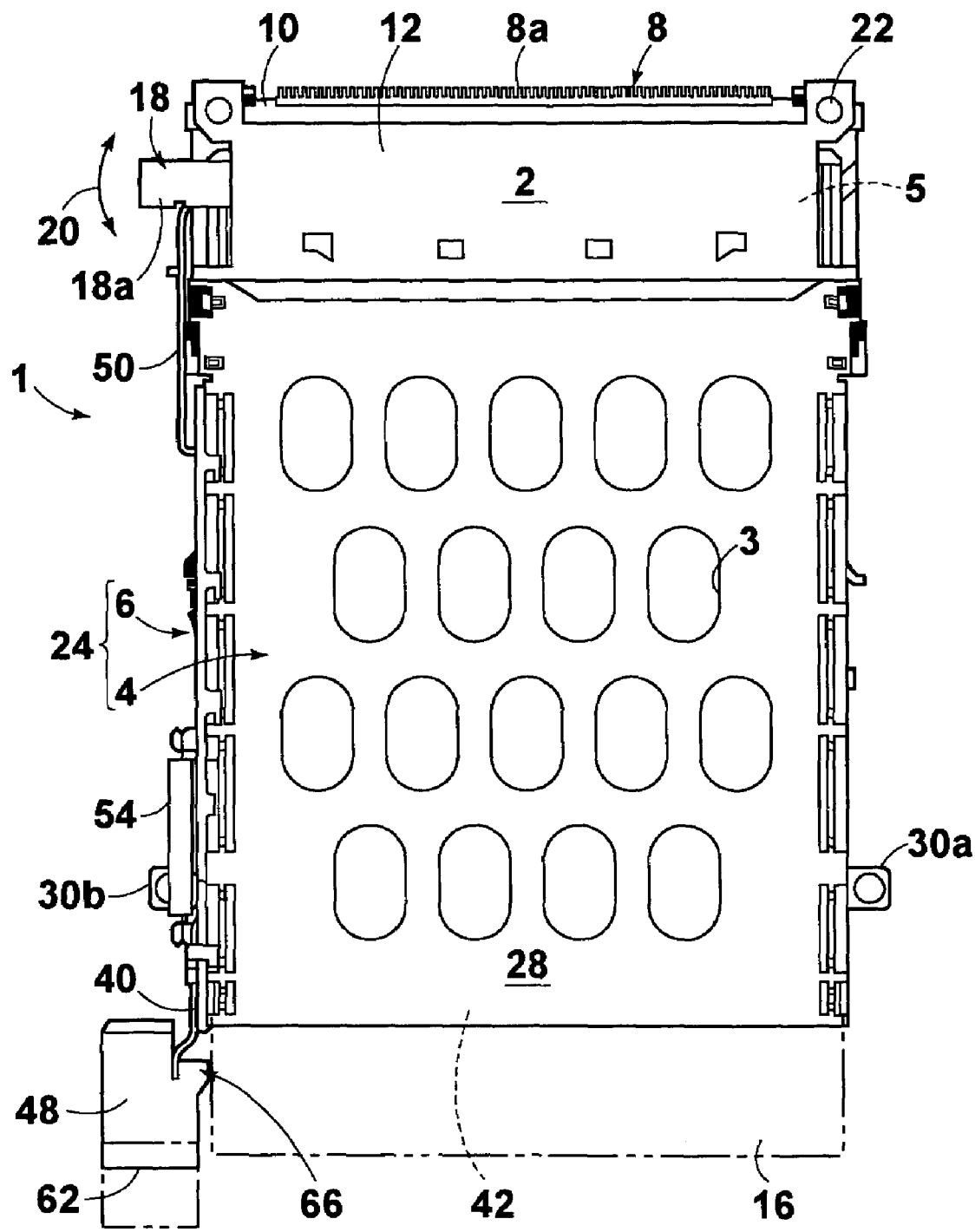
FIG. 1 is a plan view showing a card connector assembly of the present invention.
Figure 2A:
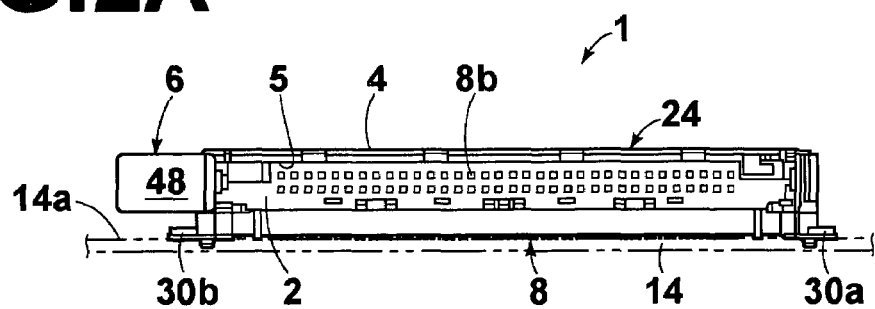
FIG. 2A is a front view.
Figure 2B:
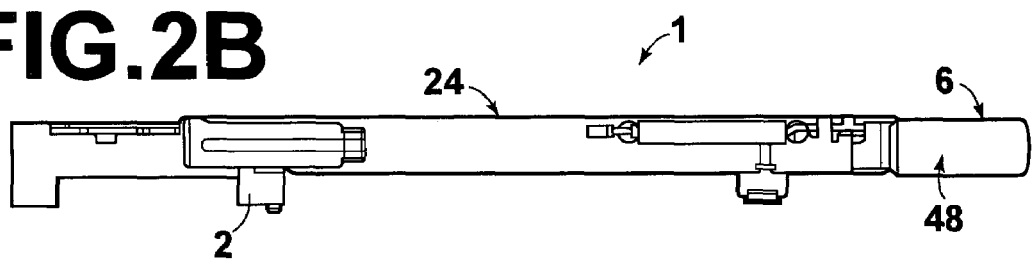
FIG. 2B is a left side view.
Figure 2C:
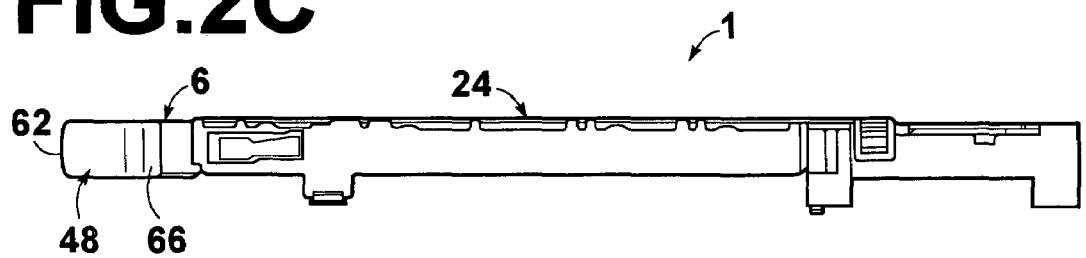
FIG. 2C is a right side view.

An embodiment of the card connector assembly (hereinafter, simply referred to as "assembly") of the present invention will now be described with reference to the attached drawings. The assembly 1 as shown in FIGS. 1 and 2, comprises a frame assembly 24 and a connector 2. The frame assembly 24 comprises a frame 4 and an ejecting mechanism 6. A card 16, illustrated by broken lines in FIG. 1, is shown completely inserted into the assembly 1. The connector 2 comprises a substantially rectangular housing 12, which is molded from an insulative material. A cavity 5, which is open toward the front, is formed in the interior of the housing 12. The front end of the card 16 is receivable within the cavity 5. A large number of contacts 8 are disposed in a rear wall 10 of the connector 2. One end 8b (refer to FIG. 2A) of each of the contacts 8 includes a contact section which protrudes toward the interior of the housing 12 to electrically connect with corresponding contacts (not shown) of the card 16. The other end includes a terminal 8a of each of the contacts 8 which protrudes toward the exterior from the rear wall 10 to be connected with a circuit board 14 (refer to FIG. 2A).

A pivoting ejector 18 for ejecting the inserted card 16, is provided within the housing 12. The pivoting ejector 18 is pivotable in the direction indicated by arrow 20 of FIG. 1. A first end 18a of the pivoting ejector 18 is exposed. The other end of the pivoting ejector 18, which moves in the opposite direction as the first end 18a, is positioned within the housing 12. The pivoting ejector 18 is a well known structure, therefore a detailed description will be omitted here. Fastener openings 22, are provided at both sides of the rear end of the housing 12 for receiving fasteners for securing the housing 12 to the circuit board 14.

Figure 3A:
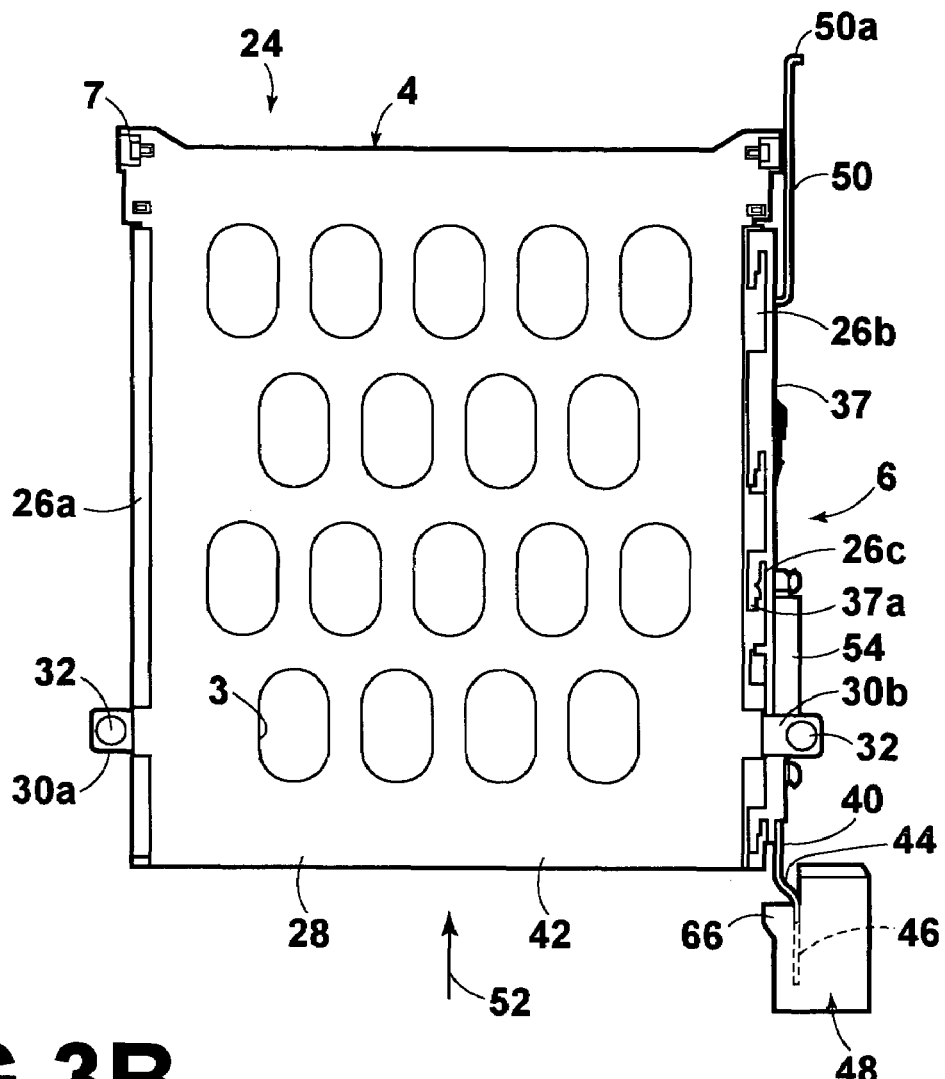
FIG. 3A is a plan view.
Figure 3B:
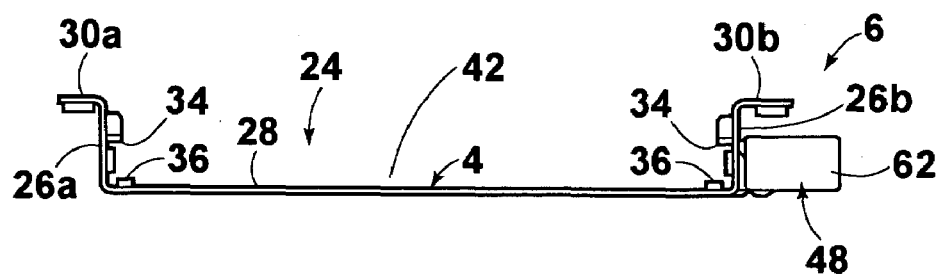
FIG. 3B is a front view.

Next, the frame assembly 24 will be described with reference to FIG. 3A, FIG. 3B, FIG. 4A, and FIG. 4B. Note that the frame assembly 24 is illustrated in FIGS. 3A and 3B in an orientation which is opposite that of the frame assembly 24 as illustrated in FIG. 1. The frame 4 is formed into a C-shape in cross section, by stamping and forming a single metal plate. A mounting portion 7, for mounting on the housing 12, is formed at both sides of the rear end (the upper end in FIG. 3A) of the frame 4. A card receiving opening 41 opens toward the front. Side walls 26a and 26b are formed by bending both sides, from a major surface 28 of the frame 4. Mounting tabs 30a and 30b, which are to be arranged on the upper surface 14a of the circuit board 14, are formed by bending the side walls 26. Mounting apertures 32, through which screws or suitable fasteners (not shown) pass for mounting the mounting tabs 30 to the circuit board 14 are located in the mounting tabs 30. Apertures 3 are formed in the major surface 28 to reduce the weight of the frame 4.

As illustrated in FIG. 3B, first guide ribs 34 are formed by punching and forming from the side walls 26. The first guide ribs 34 are formed on the inner sides of the side walls 26, that is, on the side of the side walls 26a and 26b that face each other. In addition, second guide ribs 36 are formed by punching and forming the major surface 28, in the vicinity of the side walls 26. The first and second guide ribs 34 and 36 are formed along the insertion/ejection direction of the card 16 at a plurality of locations. The first and second guide ribs 34 and 36 serve to restrict vertical movement of the card 16 during insertion and ejection thereof. The side walls 26 guide the card 16 in the horizontal direction.

An ejecting mechanism 6 is attached to the side wall 26b of the frame 4. A metallic cover 37, which is a part of the ejecting mechanism 6, is attached to the side wall 26b. The cover 37 extends along the side wall 26b, and is generally C-shaped in cross section. The cover 37 and the side wall 26b are attached to each other by the engagement of an engagement piece 37a, which is formed on the cover 37, with an engagement piece 26c of the side wall 26b. A gap (not shown), which is slightly larger than the thickness of a push rod 40, is formed between the cover 37 and the side wall 26b. The push rod 40 of the ejecting mechanism 6 is provided within the gap so that it is slidable along the insertion/ejection direction of the card 16.

Next, the push rod 40 will be described in further detail. The push rod 40 is an elongated plate shaped member, which is formed by stamping and forming a metal plate. The push rod 40 extends within the gap, along the insertion/ejection direction of the card 16. An eject button mounting portion 46 is formed at the front end of the push rod 40 toward the side of the card receiving opening 42, via a step 44. The eject button mounting portion 46 is formed so that it protrudes frontward, and is bent outwardly. An eject button 48 is mounted on the eject button mounting portion 46 either by press fitting or by overmolding. Meanwhile, an actuating arm 50, for urging the first end 18a of the pivoting ejector 18 to eject the card 16, is attached to the rear end of the push rod 40.

The ejecting mechanism 6, which includes the push rod 40 and the actuating arm 50, operates as follows. When the eject button 48 is pressed along the insertion direction 52 of the card 16, the rear end 50a of the actuating arm 50, which is linked to the push rod 40, engages and drives the pivoting ejector 18. The second end of the pivoting ejector 18 urges the front end of the card 16, which is within the housing 12, in the ejection direction, to eject the card 16. After the card 16 is ejected, a coil spring 54, which is positioned between the push rod 40 and the frame 4, returns the push rod 40 to its original position. The ejection mechanism 6 may be of any form, as long as it operates as described above. For example, the ejecting mechanism 6 may be a so called "push/push" type mechanism comprising a heart shaped cam, as disclosed in aforementioned Japanese Unexamined Patent Publication No. 2002-110286 or Japanese Unexamined Patent Publication No. 2001-291553. Alternatively, the ejecting mechanism may be of any other desired form.

Next, the eject button 48, will be described in greater detail with reference to FIG. 5 and FIG. 6. Note that in FIG. 5 and FIG. 6, the card 16 and a case 56 are illustrated as hatched portions. As illustrated in FIG. 5, when the assembly is mounted in the interior of the case 56 (56a and 56b), the card receiving opening 42 is positioned toward the interior of the case 56. The rear end 16b of the card 16, which is inserted in the assembly 1, protrudes slightly from the case 56.

The eject button 48 is capable of moving from a protruded position, illustrated by broken lines, to a depressed position, illustrated by solid lines. That is, when the eject button 48 is pressed from its protruded position, the card 16, which is inserted in the assembly 1, can be ejected. Here, attention should be focused on the fact that a single opening 58 is formed by the case 56a and 56b, and the fact that the entire assembly 1 is housed within this opening 58. This structure is adopted in order to miniaturize devices, such as personal computers. Accordingly, the case 56 is not interposed between the frame 4 and the eject button 48.

Figure 6:
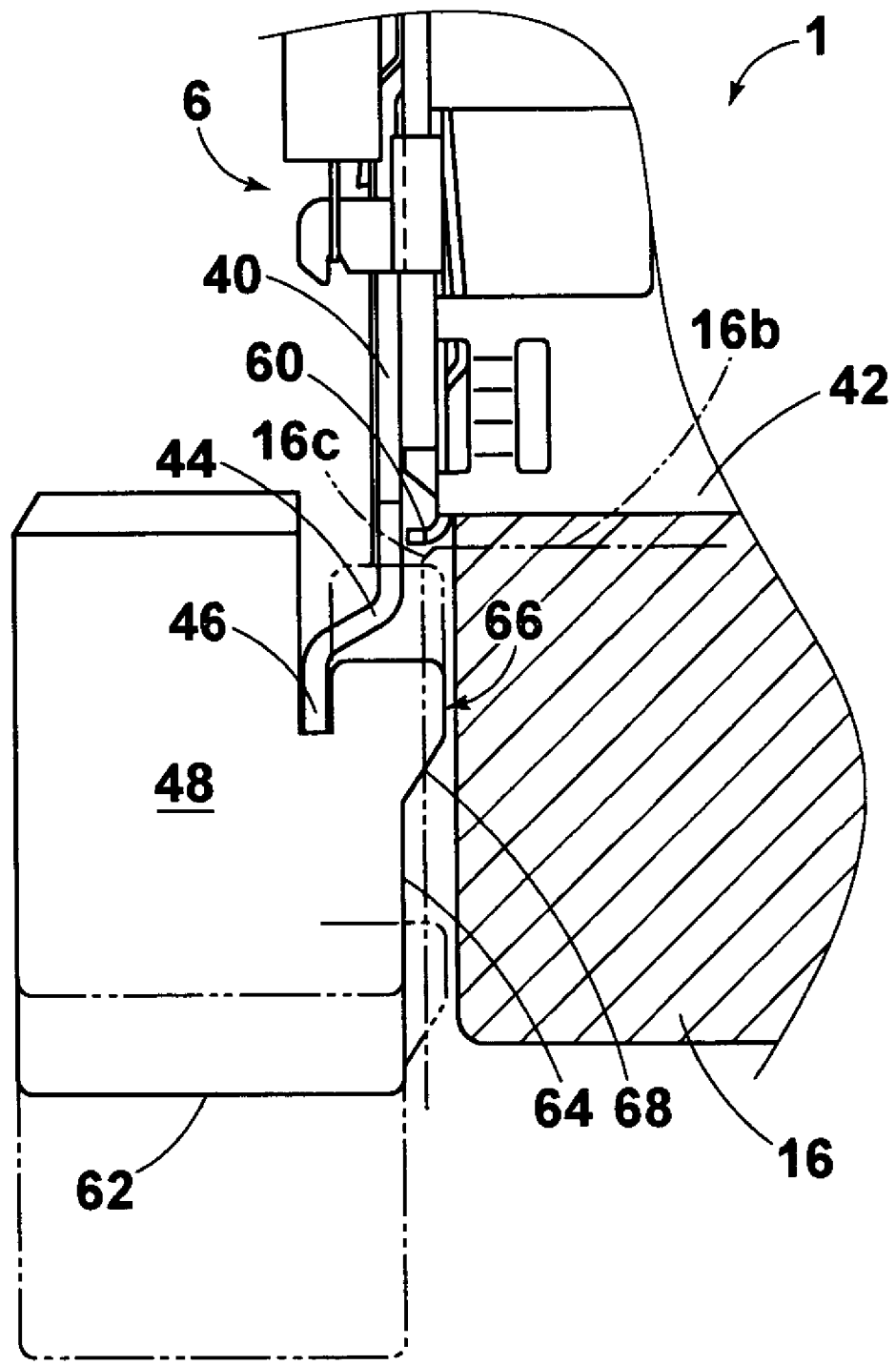
FIG. 6 is a partial exploded view, showing an eject button in further detail.

Referring to FIG. 6, the card receiving opening 42 is formed at the front end of the frame 4. However, a lateral edge portion 60 is formed by bending the end of the frame 4 on the side of the ejecting mechanism 6. Accordingly, there is a risk that a leading corner 16c of the card 16 will strike the lateral edge portion 60, thereby preventing smooth insertion of the card 16 into the card receiving opening 42, if the card 16 is inserted in this state.

Figure 4A:
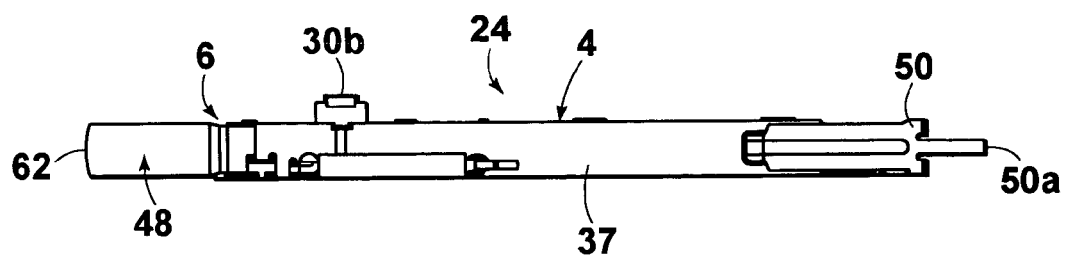
FIG. 4A is a right side view.
Figure 4B:
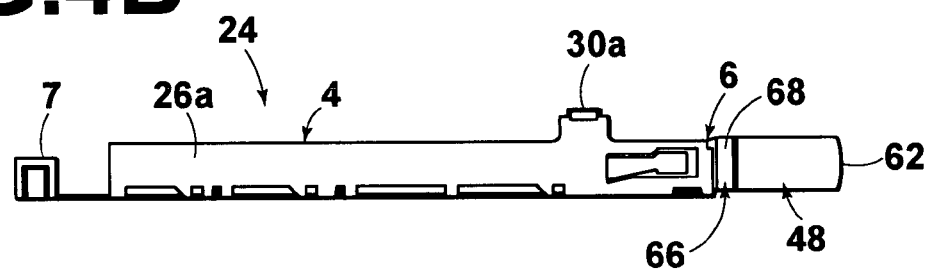
FIG. 4B is a left side view.

The eject button 48, which is utilized in the assembly 1 of the present invention, is substantially cuboid, and has a function of guiding the leading corner 16c of the card 16. The eject button 48 has a pressing surface 62, which is perpendicular to the insertion/ejection direction of the card 16. A protrusion 66 is formed on an inner surface 64 of the eject button 48. The protrusion 66 is positioned toward the front of the lateral edge portion 60 of the frame 4. A tapered surface 68, for guiding the leading corner 16c of the card 16, is formed on the protrusion 66. The tapered surface 68 is formed along the height direction of the eject button 48, as illustrated in FIG. 4B. Accordingly, even if the card 16 is slightly misaligned in the vertical direction during insertion thereof, the leading edge 16c can be guided smoothly. Therefore, the card 16 is enabled to be smoothly inserted into the card receiving opening 42, without abutting the lateral edge portion 60.

A tapered surface 70 may also be formed on the case 56b, to guide the front end at the side of card 16 opposite that of the ejecting mechanism 6.

What is claimed is:

1. A card connector assembly comprising:
   a frame;
   a card receiving opening disposed in the frame;
   a connector, which is attached to the frame at an end thereof opposite that of the card receiving opening, for electrically connecting with a card, which is insertable into the frame;
   an ejecting mechanism, which is attached to a lateral side of the frame, for ejecting the card from the frame;
   a push rod, which is a part of the ejecting mechanism, that slides along an insertion/ejection direction of the card;
   an eject button disposed on the push rod at the end thereof on the side of the card receiving opening; and,
   a guide portion formed on the eject button, the guide portion including an inner surface and a protrusion;
   wherein the guide portion is positioned forward of a lateral side edge of the card receiving opening and the protrusion provided on the eject button extends inward from the inner surface of the eject button in a direction generally perpendicular to the insertion/ejection direction, the protrusion having a tapered surface for guiding a leading corner of the card from the inner surface onto the protrusion.

2. The card connector assembly as defined in claim 1 wherein the tapered surface is formed along the height direction of the eject button.

3. The card connector as defined in claim 2 wherein side walls bent from a major surface form the frame.

4. The card connector as defined in claim 3 further comprising first guide ribs formed on inner sides the side walls.

5. The card connector as defined in claim 4 further comprising second guide ribs formed on the major surface in the vicinity of the side walls.

6. The card connector as defined in claim 2 further comprising an actuating arm linked to the push rod and disposed to drive a pivoting ejector located near the connector.

7. The card connector as defined in claim 6 further comprising a spring positioned between the push rod and the frame.

* * * * *